United States Patent [19]
Cullen et al.

[11] Patent Number: 5,515,833
[45] Date of Patent: May 14, 1996

[54] EXHAUST GAS RECIRCULATION SYSTEM WITH IMPROVED ALTITUDE COMPENSATION

[75] Inventors: Michael J. Cullen, Northville; Richard L. Wanat, Troy, both of Mich.; Joseph N. Ulrey, Horishima, Japan

[73] Assignee: Ford Motor Company, Dearborn, Mich.

[21] Appl. No.: 359,177

[22] Filed: Dec. 19, 1994

[51] Int. Cl.⁶ .................................................. F02M 25/07
[52] U.S. Cl. ............................................................ 123/571
[58] Field of Search ................................. 123/568, 569, 123/571; 364/431.06

[56] References Cited

U.S. PATENT DOCUMENTS

| | | | |
|---|---|---|---|
| 4,171,691 | 10/1979 | Nohira et al. | 123/571 |
| 4,333,438 | 5/1982 | Perez et al. | 123/569 |
| 4,399,799 | 8/1983 | Romblom et al. | 123/571 |
| 4,488,533 | 12/1984 | Sekiguchi et al. | 123/571 |
| 4,534,334 | 8/1985 | Murakami et al. | 123/571 |
| 4,719,893 | 1/1988 | Buslepp et al. | 123/571 |
| 4,825,841 | 5/1989 | Norota et al. | 123/571 |
| 5,005,552 | 4/1991 | Kawamura | 123/571 |
| 5,029,569 | 7/1991 | Cullen et al. | 123/494 |
| 5,205,260 | 4/1993 | Takahashi et al. | 123/571 |

*Primary Examiner*—Willis R. Wolfe
*Attorney, Agent, or Firm*—Allan J. Lippa; Roger L. May

[57] ABSTRACT

An internal combustion engine includes an exhaust gas recirculation (EGR) mechanism for transporting a controlled amount of exhaust gas generated by the engine from the exhaust manifold to an intake manifold of the engine. An electronic engine controller (EEC) controls the EGR rate by determining a base EGR rate as a function of a plurality of engine operating parameters and a blending value which increases the base EGR rate over a predetermined period of time. A maximum EGR rate value is then determined as a function of a value indicative of the ratio of current air charge drawn into an intake manifold of the engine to the peak aircharge available to the engine at wide-open throttle and at the current rotational speed of the engine and the ambient barometric. The base EGR rate is then compared against the maximum EGR rate value and the EGR rate is determined as a function of the lesser of the two values.

15 Claims, 3 Drawing Sheets

EXHAUST GAS RECIRCULATION SYSTEM WITH IMPROVED ALTITUDE COMPENSATION

FIELD OF THE INVENTION

This invention relates to the field of electronic engine control and more particularly to the field of controlling the exhaust gas recirculation rate in an internal combustion engine.

BACKGROUND OF THE INVENTION

Internal combustion engines typically utilize an exhaust gas recirculation (EGR) system to recirculate a controlled portion of exhaust gas generated by the engine into an intake manifold of the engine in order to provide a reduction in $NO_x$ emissions generated by the engine. Typically, a control mechanism is provided which varies the EGR rate according to one or more sensed conditions such as engine temperature, air charge entering the intake manifold of the engine, and engine speed. Some systems such as described by Romblom et al. in U.S. Pat. No. 4,399,799 also adjust the EGR rate as a function of barometric pressure to compensate for differences in air pressure which exist at different altitudes. While Romblom et al. describe a mechanical EGR control system, other systems utilize an electronic controller to determine EGR rate as a function of inferred barometric pressure.

The inventors herein have recognized that such systems, while providing improved performance and reduced emissions, exhibit sensitivity to inferred barometric pressure, which is prone to error, and also fail to provide an optimum EGR rate over a variety of altitudes.

Accordingly, there is a need for a system which provides an optimum EGR rate at a variety of engine operating ranges and atmospheric conditions without the extensive calibration and cost required in known systems.

SUMMARY OF THE INVENTION

It is an object of the present invention to provide an exhaust gas recirculation system which accurately determines an exhaust gas recirculation rate over variety of vehicle operating and atmospheric conditions without the extensive calibration efforts and cost required by known systems.

In accordance with the primary object of the invention, in a preferred embodiment a method of controlling the rate of exhaust gas recirculation in an internal combustion engine is performed by generating a rpm value which is indicative of the rotational speed of the engine, generating an aircharge value which is indicative of aircharge entering an intake manifold of the engine and generating a barometric pressure value which is indicative of ambient barometric pressure. A base exhaust gas recirculation rate value is then determined as a function of at least the rpm value and the aircharge value. Next, a maximum allowable exhaust gas recirculation rate is determined as a function of a value indicative of the ratio of the aircharge value to a value indicative of the peak aircharge available to the engine at wide-open throttle and at a rotational speed of the engine which corresponds to the rpm value and at an ambient barometric pressure which corresponds to the barometric pressure value. The base exhaust gas recirculation rate is compared to the maximum allowable exhaust gas recirculation rate, and the rate of exhaust gas recirculation is determined as a function of the lesser of the base exhaust gas recirculation rate and the maximum allowable exhaust gas recirculation rate.

An advantage of certain preferred embodiments is that driveability and emissions are improved by minimizing EGR when the driver of the vehicle backs off on the throttle. In addition, scheduling of EGR in the manner contemplated reduces development cost of the EGR system by minimizing extensive calibration efforts.

These and other features and advantages of the present invention may be better understood by considering the following detailed description of a preferred embodiment of the invention. In the course of this description, reference will frequently be made to the attached drawings.

DETAILED DESCRIPTION

Figure 1:
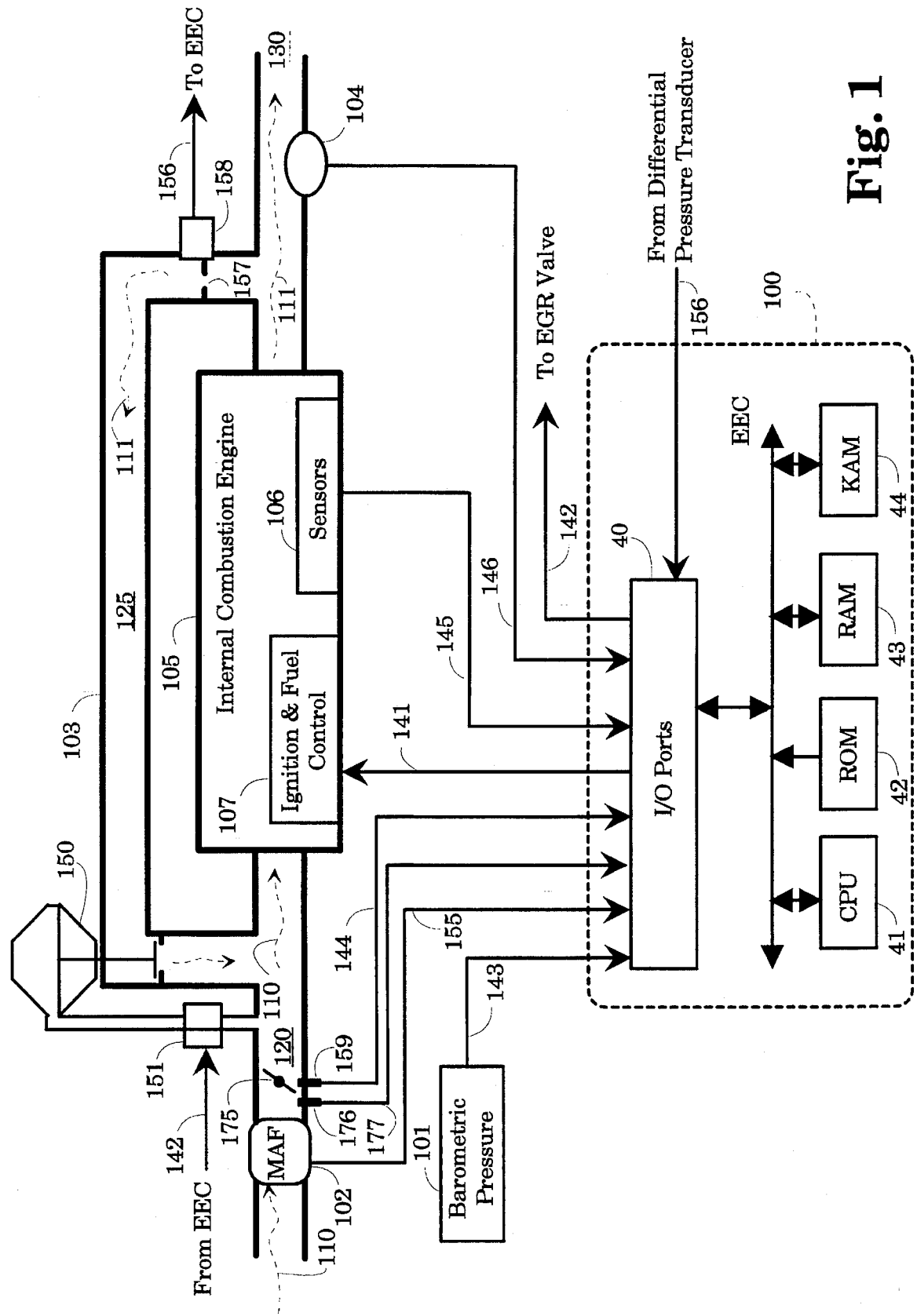
FIG. 1 of the drawings shows a block diagram of a portion of an internal combustion engine and electronic engine controller which embody the principles of the invention.

In FIG. 1 of the drawings the operation of an internal combustion engine 105 is controlled by an Electronic Engine Controller (EEC) 100 which includes a central processing unit 41, a read-only memory (ROM) 42 for storing control programs, a random-access memory (RAM) 43 for temporary data storage, a keep-alive-memory (KAM) 44 for storing learned values, a conventional data bus and I/O ports 40 for transmitting and receiving signals to and from the engine. EEC 100 receives signals from a plurality of sensors, seen generally at 106, which transmit signals containing information indicative of the rotational speed of the engine, the temperature of engine coolant circulating in the engine, and other engine operating parameters to EEC 100 over signal lines, seen generally at 145. Each of the sensors 106 are conventional and may take one of several known forms. EEC 100 receives signals 145 along with other signals such as 143, 144 and 146 and generates control signals for controlling spark timing, the rate of fuel delivered to combustion chambers of the engine and other operational functions of the engine.

Engine 105 draws an intake air mixture into intake manifold 120 past a Mass Air Flow (MAF) sensor 102 which detects the mass flow rate of air entering the intake manifold 120 and transmits a MAF signal 155 to EEC 100. A throttle position sensor 159 senses the angular position of throttle 175 and transmits a throttle position signal 144 which is indicative of the angular position of the throttle 175 to EEC 100. Dotted lines 110 indicate the flow of the intake charge entering intake manifold 120. An air temperature sensor 176 detects the temperature of the air charge entering intake manifold 120 and transmits a representative signal 177 to EEC 100. Barometric pressure sensor 101 detects barometric pressure and transmits a representative signal 143 to EEC 100. Sensors 159, 176 and 102 are each conventional.

Exhaust generated from the combustion of an air/fuel mixture within combustion chambers (not shown) of engine 105 travels from the combustion chambers through exhaust manifold 130. Dotted lines 111 indicate the flow of the exhaust gas generated by the engine. A Heated Exhaust Gas Oxygen (HEGO) sensor 104 detects the oxygen content within the exhaust gas and transmits a representative signal 146 to EEC 100.

The engine 105 includes an exhaust gas recirculation (EGR) system for transporting a controlled portion of exhaust gas generated by the engine from an exhaust manifold 130 into intake manifold 120, through an EGR passage 125. The amount of exhaust gas which is recirculated from the exhaust manifold to the intake manifold is controlled by a pneumatically actuated EGR valve 150. EGR valve 150 is connected to a vacuum modulating solenoid 151 which controls the operation of EGR valve 150 in accordance with an EGR rate signal 142 generated by EEC 100. EGR passage 125 includes a metering orifice 157 and a differential pressure transducer 158, which is connected to pressure taps up and downstream of the orifice 157. The transducer 158, which is commercially available from Kavlico Corp. of Moorpark, Calif., transmits a signal 156 which is indicative of the pressure drop across orifice 157.

Figure 2:
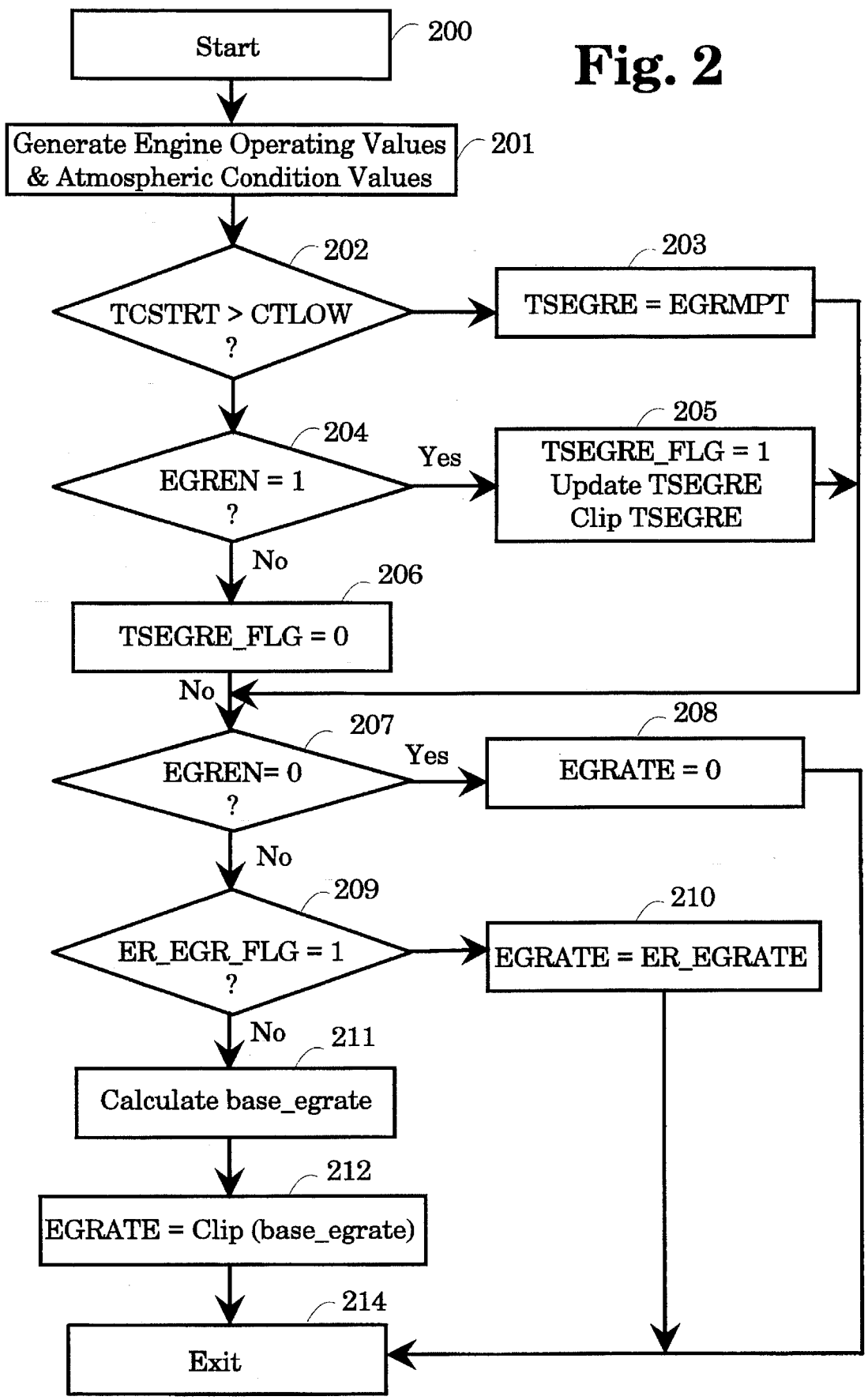
FIG. 2 is a flowchart of the steps executed in a preferred embodiment.

FIG. 2 of the drawings shows the steps taken by a preferred embodiment to implement an EGR rate generation routine to generate EGR rate signal 142. A preferred embodiment advantageously generates EGR rate signal 142 in a manner which compensates for varying altitudes and provides an optimum EGR rate at a variety of air charge values.

The EGR rate generation routine is performed as a portion of background routine executed by the EEC 100. The background routine executes substantially continuously in the absence of higher priority interrupt routines, the processing of which takes precedence over the background routine. The EGR rate generation routine is initiated at 200 and at step 201, a plurality of engine operational values, including preferably an rpm value indicative of the rotational speed of the engine, an air charge value AC indicative of the aircharge entering the intake manifold of the engine, an aircharge temperature value ACT indicative of the temperature of the aircharge, and an engine temperature value ECT indicative of the temperature of engine coolant circulating in the engine are generated along with a barometric pressure value which is indicative of ambient barometric pressure, are generated for use by the EGR rate generation routine. Alternatively, other methods may be utilized to determine the temperature of the engine, such as measuring the temperature of the cylinder head. In such a system, the temperature of the cylinder head would be utilized in place of the engine coolant temperature as an indicator of engine temperature.

At steps 202–206 the value of a variable TSEGRE which is indicative of an accumulated time, from initialization of the EEC at engine start, for which EGR is enabled, is determined. First, at 202 an initial test is performed to determine if a hot restart of the engine is taking place. A preferred embodiment advantageously increases the actual EGR rate over a period of time from zero EGR to a desired EGR rate in order to enhance engine driveability if the engine temperature is below a predetermined threshold temperature. This function is performed by determining at 202 if a hot restart of the engine has taken place. As will be appreciated by those skilled in the art, the term hot restart is understood to mean the starting of an engine when the engine temperature is sufficiently high, i.e. above a threshold temperature, such that the engine can maintain good combustion stability and air/fuel control in the presence of EGR.

At 202, the hot restart determination is performed by comparing the value TCSTRT which is indicative of the temperature of engine coolant circulating within the engine, to a calibration constant CTLOW which is indicative of a predetermined maximum value of engine coolant. If TCSTRT is greater than CTLOW then a hot restart is determined to have occurred and at 203 variable TSEGRE which contains a value indicative of an accumulated amount of time that EGR has been enabled is set equal to a calibration constant EGRMPT which is a value indicative of time period in which the EGR rate is increased from a value of zero, i.e. no EGR, to a value as determined by an intermediate base exhaust gas recirculation rate value to be described below.

If a hot restart is not detected at 202 then at 204 an EGR enabling flag, EGREN, is checked to determine if EGR is enabled. The flag EGREN preferably has a value of one if EGR is enabled and a value of zero if EGR is disabled. If EGR is found to be enabled at 204 then at 205 an EGR time flag TSEGRE_FLG is set to a value of 1. The flag TSEGRE_FLG advantageously enables or disables the counting of the EGR timer designated as TSEGRE which as explained above counts from a value of zero, at engine start when the EEC is initialized, to a maximum value designated by the constant EGRMPT, which preferably has a value of thirty seconds. When TSEGRE_FLG has a value of one, TSEGRE will be updated, and when TSEGRE_FLG has a value of zero, updating of TSEGRE will be disabled.

Once TSEGRE_FLG is set to a value of one, TSEGRE is updated as a function of a timer value BGTMR which contains a value indicative of an amount of time elapsed between the present execution of the EGR rate generation routine and the prior execution of the EGR rate generation routine. Finally, at 205, once TSEGRE has been updated, it is compared against EGRMPT, and clipped to a value equal to EGRMPT if TSEGRE has been updated to a value which is greater than EGRMPT. The routine then proceeds to step 207.

If EGR is found at 204 to be disabled, then at 206, TSEGRE_FLG is set to a value of zero, and the routine proceeds to step 207 where the EGR enable flag EGREN is checked to determine if EGR is disabled. If EGREN is equal to zero then EGR is determined to be disabled and at 208, an EGR rate value, which is used by EEC 100 to generate EGR rate signal 142 is set to a value of zero. EGR rate value, EGRATE designates increasing EGR rates with increasing values of EGRATE. Thus a value in EGRATE of zero indicates that no exhaust gas will be recirculated from exhaust manifold 130 to intake manifold 120. Once step 208 is executed, the routine is exited at 214.

If at 207, EGR is not found to be disabled, then at 209, an EGR testing flag ER_EGR_FLG is tested to determine if an EGR test mode has been enabled. A preferred embodiment advantageously sets EGR rate value EGRATE to a predetermined rate designated by constant ER_EGRATE at 210 to enable testing of the EGR system. Once step 210 is executed, the routine is exited at step 214.

If the EGR test mode is determined at 209 to be disabled, then EGR rate value EGRATE is determined by executing steps 211 and 212. At 211, a base EGR value is calculated as a function of a plurality of engine operating parameters and atmospheric conditions as shown in the following relationship:

base_egrate=*FN211(ECT)\*FN220(ACT)\*(FN908A(N,AC)\*FN212A(BP)+FN908B(N,AC)\*FN217A(BP))\*(TSEGRE/EGRMPT)* where,

FN211(ECT) is a value retrieved from a table of values indexed by Engine Coolant Temperature (ECT), each of the values being indicative of the ability of the engine to maintain combustion stability and to control air/fuel in the presence of EGR at a particular engine coolant temperature;

FN220(ACT) is a value retrieved from a table of values indexed by Air Charge Temperature (ACT), each of the values being indicative of the ability of the engine to maintain combustion stability and to control air/fuel in the presence of EGR at a particular air charge temperature;

FN908A(N, AC) and FN908B(N, AC) are each values retrieved from separate tables of values, each table being indexed by engine speed (N), and aircharge (AC). Values retrieved from table FN908A are indicative of an empirically derived EGR percentage value at sea-level, at a particular engine speed N, and a particular air charge AC, and values retrieved from table FN908B are indicative of an empirically derived EGR percentage value at a predetermined altitude above sea-level, at a particular engine speed N, and a particular air charge AC; and FN212A(BP) and FN217A(BP) are each values retrieved from separate tables of values, each table being indexed by Barometric Pressure (BP). Values obtained from tables FN212A and FN217A combine to proportion the EGR schedules contained in tables FN908A and FN908B function for barometric pressures other than those for which tables FN908A and FN908B were calibrated; and TSEGRE and EGRMPT are as explained above.

As used in the present specification, the term air charge (AC) is understood to be air charge entering the intake manifold of the engine in pounds per cylinder filling, as sensed by MAF sensor 102.

The base EGR value, base_egrate is first determined by generating an intermediate egr rate value as a function of a plurality of values each retrieved from a corresponding table which is indexed either by an engine operating parameter such as engine speed, air charge, engine coolant temperature, and air charge temperature, or by an atmospheric condition such as atmospheric pressure. The intermediate egr rate value is then modified by an egr blending value represented by TSEGRE/EGRMPT to generate the base egr value base_egrate. The egr blending value advantageously generates the base egr value in a manner to gradually increase the base egr value from a value of zero to a value determined by the intermediate egr rate value. As can be seen, if a hot restart is detected at 202, then the EGR blending value will equal a value of one. Thus, if a hot restart is detected then the EGR rate will not be increased over a period of time, but rather will be determined in a manner to account for the temperature of the engine.

At 212, the EGR rate value EGR_RATE is determined by clipping base_egrate to ensure that it does not exceed a maximum base egr value by the following relationship:

base_egrate=min(base_egrate, *FN248(PCT_*LOAD))

where, FN248(PCT_LOAD) is a value, retrieved from a table of values, indexed by percent load (PCT_LOAD), each of the values being indicative of an empirically determined maximum allowable exhaust gas recirculation rate for a particular percent load value. As used in the present specification, the value PCT_LOAD is understood to represent the ratio of the current air charge (AC) to the peak air charge available to the engine at wide open throttle at the current engine speed and barometric pressure. As will be appreciated by those skilled in the art in view of the present disclosure, the value PCT_LOAD is related to the vacuum existing in the intake manifold. As the value of PCT_LOAD increases, manifold vacuum decreases, and the EGR valve closes due to loss of the manifold vacuum required to keep the EGR valve open. A preferred method for determining PCT_LOAD is described in U.S. Pat. No. 5,029,569 titled *Method and Apparatus for Controlling An Internal Combustion Engine,* to Cullen et al. As described in the aforesaid patent, the value PCT_LOAD is generated by generating a rpm value indicative of the rotational speed of the engine and generating a throttle position value indicative of the angular position of the throttle. A ROM table, which is indexed by the engine speed and throttle position and which contains values indicative of aircharge existing at standard barometric pressure and temperature (STP) is accessed twice. First, the peak aircharge value at STP is retrieved from the table, at current engine speed and wide-open throttle. Second, a part-throttle aircharge value at STP is retrieved at current engine speed and current throttle position. Then the value PCT_LOAD is generated as the ratio of the pan throttle aircharge value at STP and the peak aircharge value at STP. As can be seen, barometric pressure, either in an inferred or measured form affects both the peak aircharge value and the part aircharge value. However, by taking the ratio of the two values, the effect of barometric pressure is cancelled. The value PCT_LOAD load thus represents the percentage of peak aircharge at the current barometric pressure.

Figure 3A:
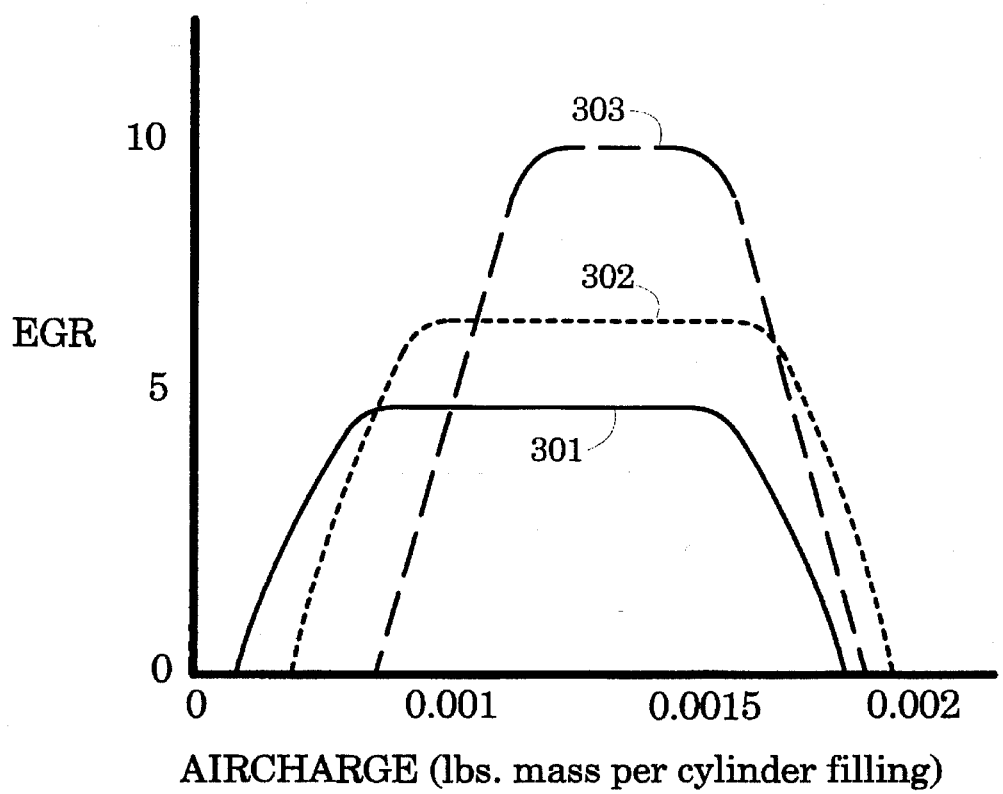
FIGS. 3(a) and 3(b) are graphs showing the relationship of exhaust gas recirculation rates to different engine operating parameters.
Figure 3B:
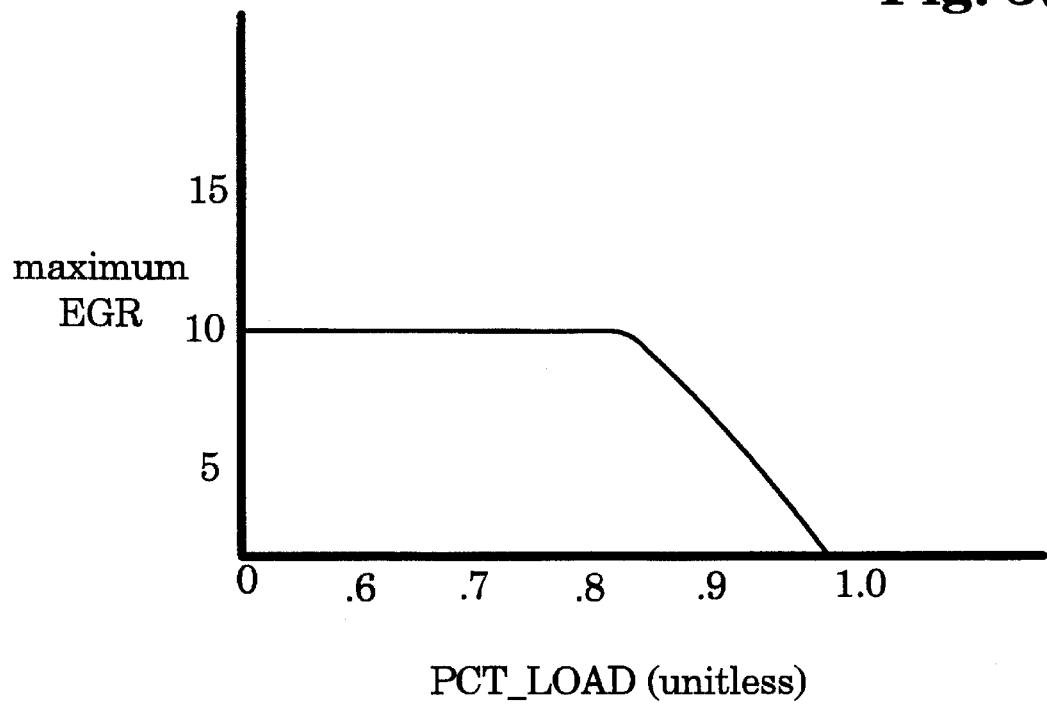

FIGS. 3(*a*) and 3(*b*) are graphs showing the relationship of EGR rates to different engine operating parameters. FIG. 3(*a*) shows typical values stored in the table designated as FN908A. The vertical axis shows EGR rates given in percentages at sea-level and the horizontal axis shows aircharge. Line 301 shows the relationship between EGR rates and aircharge for an engine speed of 1000 Revolutions Per Minute (RPM), line 302 shows the relationship between EGR rates and aircharge for an engine speed of 1500 RPM and line 303 shows the relationship between EGR rates and aircharge for an engine speed of 2000 RPM. FIG. 3(*b*) shows typical values stored in the table designated as FN248. The vertical axis shows maximum allowable EGR rates given in percentages at sea-level with the EGR actuator in a fully open position and the variable PCT_LOAD.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. In an internal combustion engine which includes an exhaust gas recirculation mechanism for transporting exhaust gas produced by said engine into an intake manifold of said engine, an electronic engine controller comprising:

means, responsive to a predetermined recirculation ramp time value, for generating an exhaust gas recirculation blending value indicative of an amount by which exhaust gas recirculation is to be increased from a rate corresponding to zero exhaust gas recirculation to an intermediate base exhaust gas recirculation rate value;

means for generating said intermediate base exhaust gas recirculation rate value as a function of a plurality of sensed engine operating parameters, which include an air charge value indicative of air charge entering an intake manifold of said engine and an ambient barometric pressure value;

means for generating a base exhaust gas recirculation rate value by altering said intermediate base exhaust gas recirculation rate value as a function of said exhaust gas recirculation blending value;

means for generating a maximum allowable exhaust gas recirculation rate value as a function of a ratio of current air charge drawn into said intake manifold to the peak aircharge available to the engine at wide-open throttle and at the current rotational speed of the engine and at the current ambient barometric pressure;

means for comparing said base exhaust gas recirculation rate value to said maximum allowable exhaust gas recirculation rate value; and means for generating an exhaust gas recirculation signal for controlling the rate at which exhaust gas is recirculated into said intake manifold as a function of the lesser of said base exhaust gas recirculation rate value and said maximum allowable exhaust gas recirculation rate value and means for transmitting said exhaust gas recirculation signal to said exhaust gas recirculation mechanism.

2. A method of controlling the rate of exhaust gas recirculation in an internal combustion engine, comprising the steps of:

receiving a rotational speed signal, indicative of the rotational speed of the engine, an airflow signal, indicative of airflow into said engine, and a barometric pressure signal, indicative of ambient barometric pressure;

generating an rpm value which is indicative of the rotational speed of the engine, in response to said rotational speed signal and generating an aircharge value which is indicative of aircharge entering an intake manifold of the engine, in response to said airflow signal;

generating barometric pressure value which is indicative of ambient barometric pressure, in response to said barometric pressure signal;

determining a base exhaust gas recirculation rate value as a function of at least said rpm value and said aircharge value;

determining a maximum allowable exhaust gas recirculation rate as a function of a value indicative of the ratio of said aircharge value to a value indicative of the peak aircharge available to the engine at wide-open throttle and at a rotational speed of the engine which corresponds to said rpm value and at an ambient barometric pressure which corresponds to said barometric pressure value;

comparing said base exhaust gas recirculation rate to said maximum allowable exhaust gas recirculation rate;

determining the rate of exhaust gas recirculation as a function of the lesser of said base exhaust gas recirculation rate and said maximum allowable exhaust gas recirculation rate; and transmitting said rate of exhaust gas recirculation to an exhaust gas recirculation actuator which controls said rate of exhaust gas recirculation.

3. The method as set forth in claim 1 wherein the step of determining a base exhaust gas recirculation rate value comprises the steps of:

generating an intermediate egr rate value as a function of the said rpm value, an air charge value indicative of the air charge entering the intake manifold of the engine, an air charge temperature value indicative of the temperature of said air charge, and an engine temperature value indicative of the temperature of said engine;

determining said base exhaust gas recirculation rate value by modifying said intermediate egr rate value by an egr blending value which is indicative of a desired rate at which exhaust gas recirculation is to be increased from zero exhaust gas recirculation to a rate as determined by said intermediate egr rate value.

4. The method as set forth in claim 3 wherein the egr blending value is determined by the steps of:

setting said egr blending value to an initial value of zero;

subsequently increasing said egr blending value each time said method is executed, by an amount which is indicative of a time period elapsed between execution of the steps of said method, until said egr blending value equals a value of one.

5. The method as set forth in claim 3 wherein the step of generating an intermediate egr rate value comprises the steps of:

retrieving a first value from a first table containing a plurality of values indexed by engine temperature;

retrieving a second value from a second table containing a plurality of values indexed by air charge temperature;

retrieving a third value from a third table containing a plurality of values indexed by air charge and engine speed;

retrieving a fourth value from a fourth table containing a plurality of values indexed by barometric pressure;

retrieving a fifth value from a fifth table containing a plurality of value indexed by air charge and engine speed;

retrieving a sixth value from a sixth table containing a plurality of values indexed by barometric pressure; and generating said intermediate egr rate value as a function of said first, second, third, fourth, fifth and sixth values.

6. The method as set forth in claim 5 wherein the step of generating said intermediate egr rate value as a function of said first, second, third, fourth, fifth and sixth values comprises the step of generating the intermediate egr rate value according to the following relationship:

$$a*b((c*d)+(e*f))$$

where, a corresponds to the first value, b corresponds to the second value, c corresponds to the third value, d corresponds to the fourth value, e corresponds to the fifth value, and f corresponds to the sixth value.

7. The method as set forth in claim 6 wherein the engine temperature is determined by measuring the temperature of engine coolant circulating within said engine.

8. The method as set forth in claim 6 wherein the engine temperature is determined by measuring the temperature of the cylinder head of said engine.

9. In an internal combustion engine including an exhaust gas recirculation passage for transporting a portion of exhaust gas produced by the engine into an intake manifold of the engine, an exhaust gas recirculation mechanism, responsive to an exhaust gas recirculation signal, for regulating the rate at which exhaust gas is recirculated into the intake manifold, an electronic engine controller for generating said exhaust gas recirculation signal comprising:

a microprocessor programmed to, determine a base exhaust gas recirculation rate value as a function of an rpm value indicative of the rotational speed of the engine, an air charge value indicative of the air charge entering an intake manifold of the engine, an air charge temperature value indicative of the temperature of said air charge, and an engine temperature value indicative of the temperature of said engine;

determine a maximum allowable exhaust gas recirculation rate as a function of a value indicative of the ratio of current air charge drawn into an intake manifold of the engine to the peak aircharge available to the engine at wide-open throttle and at a rotational speed of the engine which corresponds to said rpm value and at an ambient barometric pressure which corresponds to said barometric pressure value;

compare said base exhaust gas recirculation rate to said maximum allowable exhaust gas recirculation rate, and determine the rate of exhaust gas recirculation as a function of the lesser of said base exhaust gas recirculation rate and said maximum allowable exhaust gas recirculation rate; and generate said exhaust gas recirculation signal as a function of said rate of exhaust gas recirculation; and means for transmitting said exhaust gas recirculation signal to said exhaust gas recirculation mechanism.

10. An electronic engine controller as set forth in claim 8 wherein the microprocess determines the base exhaust gas recirculation rate value by:

generating an intermediate egr rate value as a function of said rpm value, an air charge value indicative of the air charge entering the intake manifold of the engine, an air charge temperature value indicative of the temperature of said air charge, and an engine temperature value indicative of the temperature of said engine;

determining said base exhaust gas recirculation rate value by modifying said intermediate egr rate value by an egr blending value which is indicative of a desired rate at which exhaust gas recirculation is to be increased from zero exhaust gas recirculation to a rate as determined by said intermediate egr rate value.

11. An electronic engine controller as set forth in claim 10 wherein the microprocessor determines the egr blending value by:

setting said egr blending value to an initial value of zero;

subsequently increasing said egr blending value each time the rate of exhaust gas recirculation is determined by an amount which is indicative of a time period elapsed between determination of the rate of exhaust gas recirculation, until said egr blending value equals a value of one.

12. An electronic engine controller as set forth in claim 11 wherein the microprocessor generates the intermediate egr rate value by:

retrieving a first value from a first table containing a plurality of values indexed by engine temperature;

retrieving a second value from a second table containing a plurality of values indexed by air charge temperature;

retrieving a third value from a third table containing a plurality of values indexed by air charge and engine speed;

retrieving a fourth value from a fourth table containing a plurality of values indexed by barometric pressure;

retrieving a fifth value from a fifth table containing a plurality of value indexed by air charge and engine speed;

retrieving a sixth value from a sixth table containing a plurality of values indexed by barometric pressure; and generating said intermediate egr rate value as a function of said first, second, third, fourth, fifth and sixth values.

13. An electronic engine controller as set forth in claim 12 wherein the microprocessor generates said intermediate egr rate value as a function of said first, second, third, fourth, fifth and sixth values by:

generating the intermediate egr rate value according to the following relationship:

$$a*b((c*d)+(e*f))$$

where, a corresponds to the first value, b corresponds to the second value, c corresponds to the third value, d corresponds to the fourth value, e corresponds to the fifth value, and f corresponds to the sixth value.

14. The method as set forth in claim 13 wherein the engine temperature is determined by measuring the temperature of engine coolant circulating within said engine.

15. The method as set forth in claim 13 wherein the engine temperature is determined by measuring the temperature of the cylinder head of said engine.

* * * * *